United States Patent
McConnell et al.

[19]

[11] Patent Number: 6,057,931
[45] Date of Patent: May 2, 2000

[54] METHOD AND APPARATUS FOR CONTROLLING COLOR IMAGE REPRODUCTION

[75] Inventors: Troy McConnell; Allan C. Reitz, both of Greensboro, N.C.

[73] Assignee: MCI Telecommunications Corporation, Washington, D.C.

[21] Appl. No.: 08/620,480

[22] Filed: Mar. 22, 1996

Related U.S. Application Data

[63] Continuation of application No. 08/091,331, Jul. 12, 1993, abandoned.

[51] Int. Cl.[7] ............................................. H04N 1/60
[52] U.S. Cl. ......................... 358/1.9; 358/518; 358/520; 382/167
[58] Field of Search .................... 358/518, 520, 358/529, 530, 1.9; 382/167; 395/109; H04N 1/60

[56] References Cited

U.S. PATENT DOCUMENTS

| | | | |
|---|---|---|---|
| 3,858,044 | 12/1974 | Frappe | 250/226 |
| 4,165,180 | 8/1979 | Failes | 356/310 |
| 4,335,398 | 6/1982 | Yamada . | |
| 4,414,635 | 11/1983 | Gast et al. | 364/526 |
| 4,613,947 | 9/1986 | Suzuka et al. | 364/526 |
| 4,623,973 | 11/1986 | Hoffrichter et al. | 364/526 |
| 4,721,951 | 1/1988 | Holler | 358/520 |
| 4,845,550 | 7/1989 | Urabe et al. . | |
| 4,866,511 | 9/1989 | Belmares-Sarabia | 358/520 |
| 4,942,461 | 7/1990 | Abe et al. . | |
| 4,966,461 | 10/1990 | Hooper | 356/406 |
| 5,032,903 | 7/1991 | Suzuki et al. | 358/448 |
| 5,089,977 | 2/1992 | Pfästerer et al. | 364/526 |
| 5,204,948 | 4/1993 | Kato | 358/520 |
| 5,335,097 | 8/1994 | Murakami | 358/520 |
| 5,359,436 | 10/1994 | Dichter et al. | 358/500 |
| 5,420,704 | 5/1995 | Winkelman | 358/520 |
| 5,596,428 | 1/1997 | Tytgat et al. | 358/518 |
| 5,612,795 | 3/1997 | Dichter | 358/518 |
| 5,724,442 | 3/1998 | Ogatson et al. | 358/520 |
| 5,793,501 | 8/1998 | Murakami | 358/520 |

*Primary Examiner*—Kim Yen Vu

[57] ABSTRACT

The present invention provides a color-control method for use in an image reproducing process where the image is reduced to a plurality of pixels, with each pixel having a color value. The color control method uses a color control program in the image reproduction process. The color control program includes a color correction module and a color separation module. The color correction program provides a method for using HSL values to select which pixels will be color corrected. The color-separation program is used to convert RGB color values to YMCK color values and provides for undercolor removal and black generation. Undercolor removal removes gray components from the hue pixel data and replaces it with black pixel data. The black generation routine provides for the selection of pixels for which black will be added by the input of selected parameter of an HSL slice range.

31 Claims, 5 Drawing Sheets

METHOD AND APPARATUS FOR CONTROLLING COLOR IMAGE REPRODUCTION

This application is a continuation of application Ser. No. 08/091,331 filed Jul. 12, 1993.

FIELD OF THE INVENTION

The present invention is related to a method and apparatus for controlling color image reproduction and more particularly to a method and apparatus for adjusting color values of pixels forming a color image.

BACKGROUND OF THE INVENTION

Computer-aided automation is currently used for pre-press operations used in developing and publishing photo-ad periodicals, specialized magazines and video catalogs. Automation of pre-press operations is essential where large volumes of photographs and text must be accumulated, sorted, half-toned, sized, paginated and printed over a short deadline. Various publishing software programs are available to automate these pre-press operations.

One important aspect of pre-press operations is the step of using a scanner to scan a color image from photographs, videos, and prints. Scanning results in the color image being divided into a plurality of pixels with each pixel forming one segment of the color image. The pixels usually have differing colors and the color of each pixel is identified by a color value which can be digitally stored within a memory such as is typically associated with a computer.

Scanners of the prior art typically use RGB values located within an RGB color space to identify the color of the pixels of a color image. An RGB color space is a cubic or color-component color space with each RGB value having a red, green, and blue component for identifying the amount of each color component in a pixel. Combining the amount of red, green, and blue color identified by the color components produces the color of the pixel identified. Other cubic or color-component color spaces, such as YMC (yellow, magenta, cyan) color space or a YMCK (yellow, magenta, cyan and black) color space, can be used to identify the color values of pixels. As used in this patent application, a cubic color space refers to a three-dimensional color space having three different-colored components that identify the amount of a particular color in a pixel.

Once digitized, the color image of a photograph can be displayed on a computer screen and the color values manipulated to make color corrections to the image. A corrected color image can then be printed by directing the corrected color values of the pixels to a four-color printer. Methods for scanning color images, providing limited correction of the color image by manipulating color values and for printing a reproduction of the color image based on the color values are known in the prior art.

There are problems, however, with the prior art methods for scanning, color correcting, and printing reproductions of color images. In order to make a color correction, the particular colors in the color image to be altered must be selected. In prior art systems complicated functions must be used by an operator to select the colors to corrected. Because of the difficulty in selecting colors, the operator must have a high level of expertise and must undertake a time-consuming process to make a desired color correction to a color image.

Another problem associated with scanning color images and printing reproductions of scanned images is the occurrence of undesired muddiness in the print due to excess amounts of the hue-inks being used to print mere gray scale darkness. An improved color image reproducing method and apparatus are needed that will enable an operator to more easily select the colors to be corrected and then to make the desired corrections. Also needed are improved methods and apparatus to properly use a black ink in the four color printing to provide gray scale components and good definition, including removal of gray components from the other inks and replacement with suitable amounts of black.

SUMMARY OF THE INVENTION

The present invention provides an improved image reproducing method which uses a color-control program to reproduce an original color image with a four color printer. The color control program includes a color correction module and a color separation module to aid in the image reproduction process. The color correction module enables a user to more effectively select which colors of a color image will be altered. In a preferred embodiment, HSL values are assigned to the pixels of the color image and used to select which colors of the color image are to be corrected. In addition, the color correction program provides an automated method for selecting which colors of the color image are to be color corrected. The automated method allows a user to select which colors are to be color corrected by simply selecting a pixel on a computer screen displaying the image using a mouse.

The color separation program provides an effective method for converting RGB values to YMCK values for four-color printing. The color separation module can be used in combination with the color correction module or can be used exclusive of the color correction module to provide conversion of RGB color values to YMCK values needed when using a four-color printer. The color separation module also provides for effective undercolor removal and black generation.

To select pixels for black generation, the color separation module includes a black generation routine designed to provide for more effective selection of pixels for which black will be added. Certain parameters of the pixels defined in HSL space are fixed, while the user is prompted for other parameters. The process of only having to select certain parameters helps make the method of selecting which pixels will be given black more efficient and effective.

The invention also provides a color correction apparatus for correcting stored, scanned pixel color data including a data input device, a memory for storing pixel color data, a video display for displaying stored pixel color data to depict a color image, and a processing unit for converting stored pixel color data from a cubic color value to an HSL color value and for receiving data input for a color correction of selected pixels falling within a defined HSL slice.

Preferably, the processing unit is also capable of converting pixels to YMC space and performing an undercolor removal data operation.

More preferably, the processing unit is also capable of converting pixels to YMC space and performing a black generation data operation.

Typically, the apparatus includes a four color printer capable of printing black, yellow, cyan and magenta. Also typically considered part of a complete setup is a scanner to raster scan a view and generate signals representative of cubic color values of pixels of the scanned view.

The apparatus according to the invention can also be considered as an undercolor removal apparatus for removing gray components from stored, scanned pixel color data and printing the resultant image. This includes a data input device, a memory for storing pixel color data with cubic color values located in a cubic color space where each cubic color value includes a first color component, a second color component, and a third color component, a processing unit for generating a black color component removed from the first, second and third color components in an amount equal to a proportion of the least of them and for reducing each of the first, second and third color components by an amount equal to the black color component; and a printer to print the pixels of the image with inks of the first, second, third and black color components.

It can also be regarded as a black addition apparatus for adding black components to stored, scanned pixel color data and printing the resultant image. In this aspect the apparatus includes a data input device, a memory for storing pixel color data with color values located in a color space where each color value includes a first color component, a second color component, and a third color component, and a black color component, a processing unit for evaluating the first second and third color components of each pixel in HSL space including hue, saturation and level values to determine if the pixel is located in a neutral window of HSL space and, if so, adding to the black color component, and a printer to print the pixels of the image with inks of the first, second, third and black color components.

If desires, HSL slice definitions can be stored in a separate file, as can neutral window definitions and % black generation. These can be used to perform the designated operations on one or more images automatically. Also, the steps need not proceed in a particular order. A series of images may be scanned and stored for later color correction and/or color separation before printing.

DETAILED DESCRIPTION OF A PREFERRED EMBODIMENT

Figure 1:
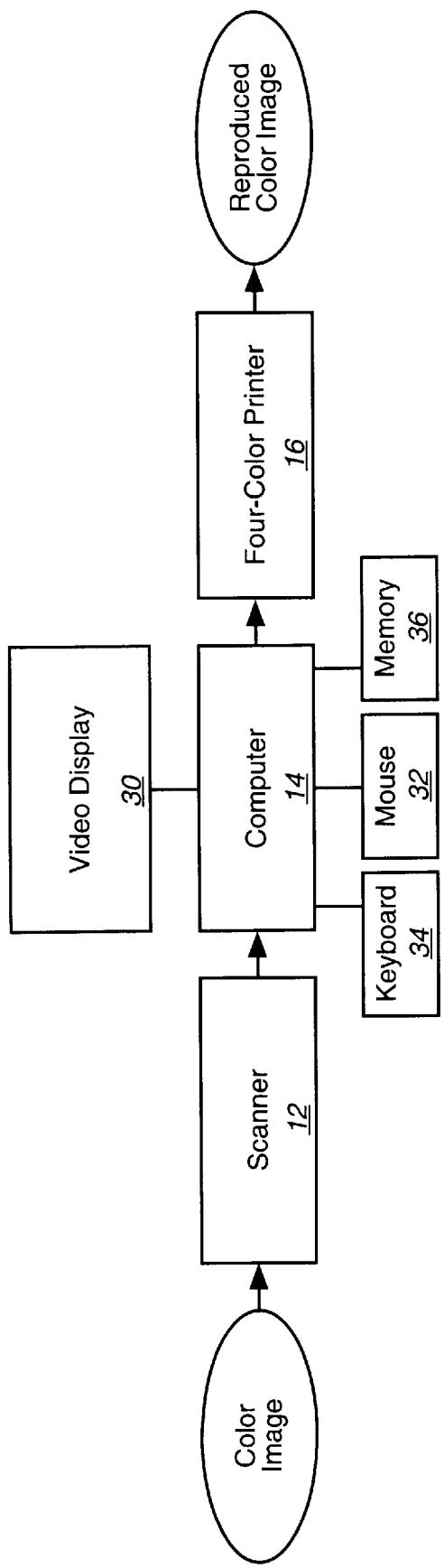
FIG. 1 is a block diagram showing an overview of an image reproduction system.

FIG. 1 shows the major components of the apparatus of an image reproduction system 10. In general, image reproduction system 10 includes a scanner 12, a compute 14, and a four-color printer 16. Scanner 12 is used to scan and digitize an original color image located on a photograph or color print. Scanning results in the color image being divided into a plurality of pixels with each pixel forming one segment of the color image. Each pixel has a color and the color of each pixel is identified by an RGB value which can be digitally stored within a memory 36 such as a disk drive, streaming tape, RAM, or the like. These are typically used with computers.

The digitized color image is sent to computer 14 where the digitized image can be stored in memory 36, manipulated, and displayed on video display 30. Data may be entered to the computer 14 by a conventional keyboard 34 and/or mouse 32. Printer 16 is capable of using a digitized image from computer 14 to print a reproduced and corrected color image. Image reproduction systems have been used for a number of years, and the technology for digitizing color images and using the digitized image to print a reproduction is known in the prior art. The publishing industry, in particular, has used image reproduction systems for pre-press operations to develop and publish photo ad periodicals, specialized magazines and video catalogs. The printer 16 can include a series of components which work together in conventional fashion to generate the reproduced color image. For example, the components may include color separation printers which produce transparencies having opaque areas for non-printing, the transparencies being used to create offset or other printing plates. These steps and the apparatus to carry them out are conventional. Other suitable printing apparatus may be used.

The present invention is directed towards color control for adjusting the colors of selected pixels within a digitized color image to be reproduced by four-color printer 16. The color control method of the present invention may be hardwired, but preferably is implemented by software in a general purpose computer such as a personal computer. Flow charts of the software are shown in FIGS. 2–7.

Figure 2:
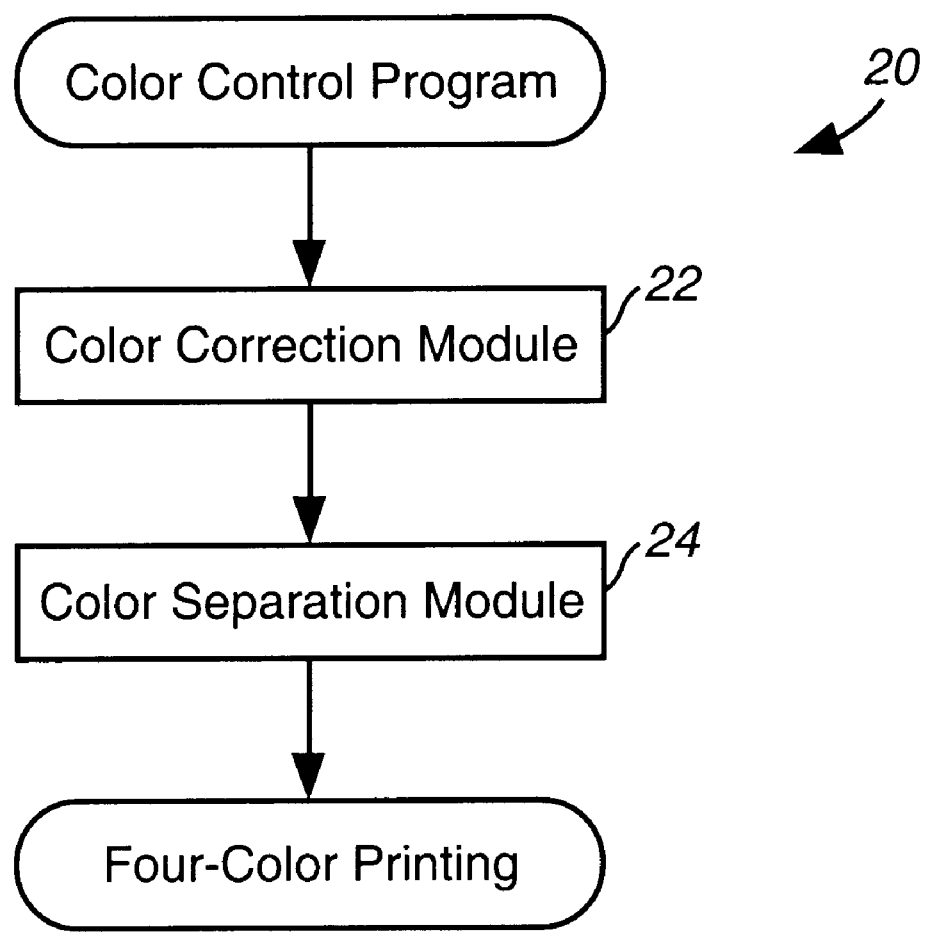
FIG. 2 is a block diagram showing the color control program for implementing the color control method of the present invention.

Referring to FIG. 2, color control program 20 is shown to include a color correction module 22 and a color separation module 24. Color correction module 22 is designed to select pixels of the color image to be color-corrected and to then correct the selected pixels. Color separation module 24 converts the color values of pixels of a color image into color-corrected YMCK color values used by the four-color printer 16. The implementation of the color control method of a color image with color correction module 22 and color separation module 24 will be described in more detail below.

Color Correction

Figure 3:
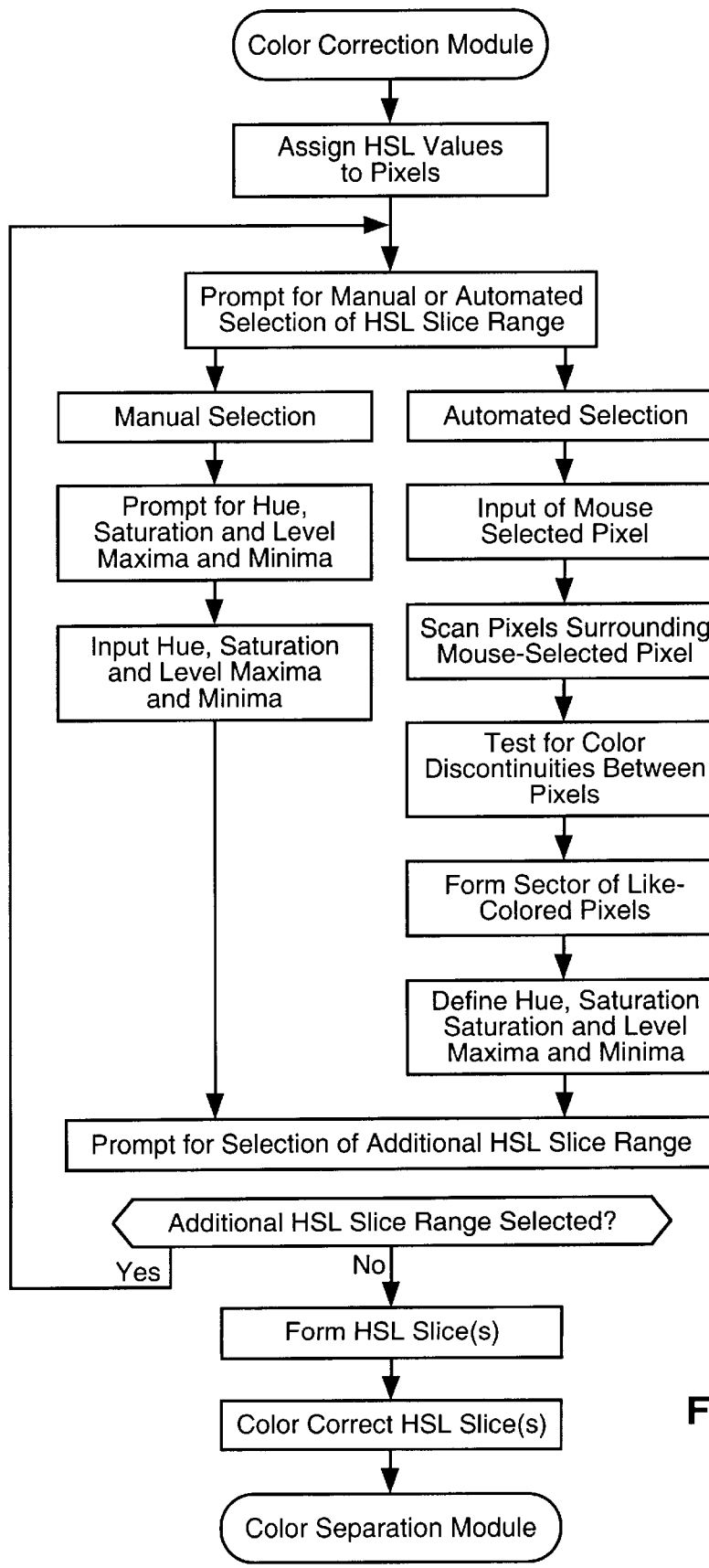
FIG. 3 is a flow chart of the color correction module of the color control program.

A flow chart of color correction program 22 is shown in FIG. 3. The first step of the color correction program 22 is to assign HSL values to pixels of the color image. HSL values are color values located in a spherical HSL color space, so the conversion is from a rectilinear, cartesian coordinate space to a modified polar coordinate space. Each HSL value includes a hue component located within a hue range, a saturation component located within a saturation range, and a level component located in a level range.

The hue component is a measure of the color of a particular pixel. In the preferred embodiment of the invention, each hue component falls within a hue range extending from a lower limit of 0 to an upper limit of 360. Different colors are identified by different numbers in the hue range. Reds range from 331 through 360 and 0 to 30. Yellows range from 31 to 90, greens range from 91 to 150, cyans range from 151 to 210, blues range from 211 to 270, and magentas range from 271 to 330. Different shades of the same color would be identified by the same hue number.

The saturation component of an HSL value is a measure of the amount of color in a particular pixel. In HSL space, saturation is depicted as a distance from the polar axis of the HSL sphere. Saturations range from 0 to 255 where 0 is a pure gray and 255 is a 100% saturation of the color specified by the hue.

The level component of an HSL value is a measure of the brightness of the particular pixel. Graphically, the level is depicted as a point in polar direction of the axis of the HSL sphere. A pixel located at the south pole of the sphere's axis would be assigned a level 0 and would be black, while a pixel located at the north pole of the sphere's axis would be assigned a level 255 and would be white. Points on the polar axis (i.e. saturation=0) are pure grays.

Defining the colors of the pixels of the color image in an HSL space has been done in the prior art and methods for converting RGB values to HSL values are also known in the prior art. The routine used in the present invention to form HSL values for the pixels is as follows:

if R equals G and G equals B then
    H=O {if the pixel is a pure gray, then hue is 0 by definition}
    S=O
    L=R
else
    high=largest of R, G, and B
    low=smallest of R, G, and B
    middle=middle of R, G, and B
    L=(low+high)/2
    S=high−low
    if R is smallest and B is largest then
        H=240−60*(middle−low)/(high−low)
    else is R is smallest and G is largest then
        H=120+60*(middle−low)/(high−low)
    else if G is smallest and R is largest then
        H=360−60*(middle−low)/(high−low)
    else if G is smallest and B is largest then
        H=240+60*(middle−low)/(high−low)
    else if B is smallest and G is largest then
        H=120−60*(middle−low)/(high−low)
    else if B is smallest and R is largest then
        H=0+60*(middle−low)/(high−low)
    endif
endif Color correction program 22 uses the HSL values of the pixels to select the pixels that are to be color corrected, which is different from prior art color correction programs. Prior programs typically select a group of pixels to be color corrected by manipulating RGB values.

Color correction program 22 provides two alternative ways to select which pixels are to be color corrected. The first is a manual selection method, and the second is an automated selection method. In the manual selection method, a user selects and inputs to the computer 14 via mouse 32 or keyboard 34 hue, saturation and level maximums and minimums to define an HSL slice range. Color correction program 22 uses the so-defined HSL slice range to form an HSL slice composed of pixels having color values falling within the defined HSL range.

In the automated selection method, the image to be corrected is displayed on a video display 30 equipped with a conventional mouse 32. The mouse 32 directs a pointer to various parts of the image on the screen 30. The user simply selects a pixel displayed on the screen by clicking the mouse when the pointer associated with the mouse identifies a portion of the image the user desires. The computer operating according to the automated selection method uses the mouse-selected pixel as a reference pixel for defining an HSL slice range. Thus, the operator is not required to manually input numbers for the HSL slice range. All he or she needs to do is to discern that a color in the image needs correction and identify that color by pointing and clicking.

The HSL slice range is defined in the computer by outwardly scanning pixels in all directions beginning at the mouse-selected pixel to form a like-colored sector of pixels surrounded by a discontinuity border of different colored pixels. The process proceeds from the reference, mouse-selected pixel to the target pixel, the next adjacent pixel to the left. If that pixel is similar enough, it is included in the sector of like-colored pixels and its HSL values are used in the comparison with the next pixel to the left. That is, the just examined pixel is treated as the reference pixel and the pixel under examination is treated as the target pixel. This continues in iterative manner until either the edge of the image or a discontinuity is encountered. Then the process proceeds from the mouse-selected pixel to the right, starting with the HSL values of the mouse-selected pixel. If the pixel to the right is similar enough, it is included in the sector of like-colored pixels and its HSL values are used in the comparison with the next pixel to the right. This continues in iterative manner until either the edge of the image or a discontinuity is encountered.

Next, the raster scan line immediately above the line in which the mouse-selected pixel is located is examined. The pixel just above the mouse selected pixel is compared with the mouse selected pixel. If it is similar enough, it is included in the sector of like-colored pixels and its HSL values are used to examine the next pixel to the left. The process proceeds as with the pixels on the line of the mouse-selected pixel, and continues with higher lines until a full-width discontinuity or the image edge is encountered. Then the lines below the line on which the mouse-selected pixel are located are examined. Of course, the order of examination is not critical, and could proceed to the right or downward before left and upward. Other patterns could also be used. The comparison made between each target pixel and the reference pixel is as follows:

RHSL_Hue=hue of the reference pixel
RHSL_Saturation=saturation of the reference pixel
RHSL_Level=level of the reference pixel
THSL_Hue=hue of the target pixel
THSL_Saturation=saturation of the target pixel
THSL_Level=level of the target pixel
Threshold=a user defined value between 0 and 255
Diff_Hue=|RHSL_Hue−THSL_Hue|
If Diff_hue>180
    Diff_hue=360−Diff_Hue
Endif
Diff_hue=diff_hue*((pi/180)*(RHSL_Saturation+ THSL_Saturation)/2)
Diff_Saturation=RHSL_Saturation−THSL_Saturation
Diff_Level=RHSL_Level−THSL_Level
distance=(Diff_hue$^2$+Diff_Saturation$^2$+Diff_Level$^2$)$^{1/2}$
If distance<=Threshold
    include target pixel in sector of like colored pixels
Endif The different-colored pixels (i.e. those for which distance>threshold) form a discontinuity border encircling the like-colored sector.

The hue, saturation, and level maxima and minima for the HSL slice range are then ascertained as the maximum and minimum HSL values of the pixels located within the sector. These maxima and minima may be displayed on the screen for the user, who can then tailor them using the manual selection method, if desired. Desirably, histograms of the number of pixels having the values in the ranges may be displayed to help the user relate the numerical values to the visual image to be corrected.

In one embodiment, the module 22 allows a user to select up to seven different HSL slice ranges, whether in the manual or automatic method. More preferably, an unlimited number of slice ranges may be used. If more than one HSL slice range is defined, the slice definitions are worked with in order and the HSL slices are successively formed. The HSL slices are formed by testing all the pixels in the color image to determine which pixels fall within one or more HSL slice ranges. Pixels falling within an HSL slice range are selected to form an HSL slice. However, pixels that fall within more than one HSL slice range are selected for only the first-defined HSL slice range in which the pixels fall. In one embodiment, the slices are checked in the following order of the color predominating in the slice: Black, red, yellow, green, cyan, blue, magenta. In a preferred embodiment, the user may define the order.

Once the HSL slices have been formed, the next step is to color correct the pixels of the HSL slices. Methods for color correcting pixels are very well-known in the prior art and will be discussed only briefly. The color corrections to the pixels falling within a HSL slice are implemented using conventional transfer curves for each of the three color components cyan, magenta and yellow, performing the correction on pixels which fall within the selected HSL slice. After correction, the corrected HSL values can be reconverted to RGB using known techniques.

Figure 4:
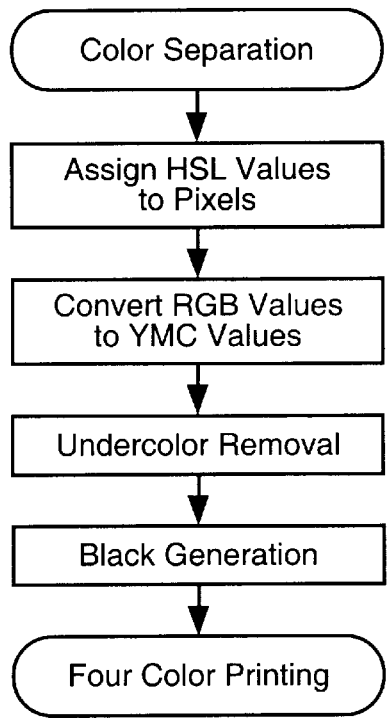
FIG. 4 is a flow chart of the color separation module of the color control program.

After completion of the color correction module 22, color separation module 24 can be used to convert the color values of all the pixels of the color image into YMCK values for four-color printing. Conversion of the color values of the pixels to YMCK values is necessary because four-color printer 16 uses yellow, magenta, cyan, and black inks to print a color image. The color values must be able to direct printer 16 as to the amount of each color of ink to be used in each pixel when printing a color image. Color separation module 24 provides an improved method to convert RGB values of the color image to YMCK values. Referring to FIG. 4, a flow chart showing the general routines of the color separation module 24 is shown. Each of these steps is described below.

The first step of the color separation module 24 is the conversion of the RGB values of the pixels to YMC values. Converting RGB values to YMC values is a simple process and is defined as follows:

$$y = 255 - B$$

$$m = 255 - G$$

$$c = 255 - R$$

where 255 is a selected upper limit of the color values. The YMC values do not have a K (black) component. The black component of the YMCK value to be produced is formed through an undercolor removal process and a black generation process.

Undercolor Removal

Figure 5:
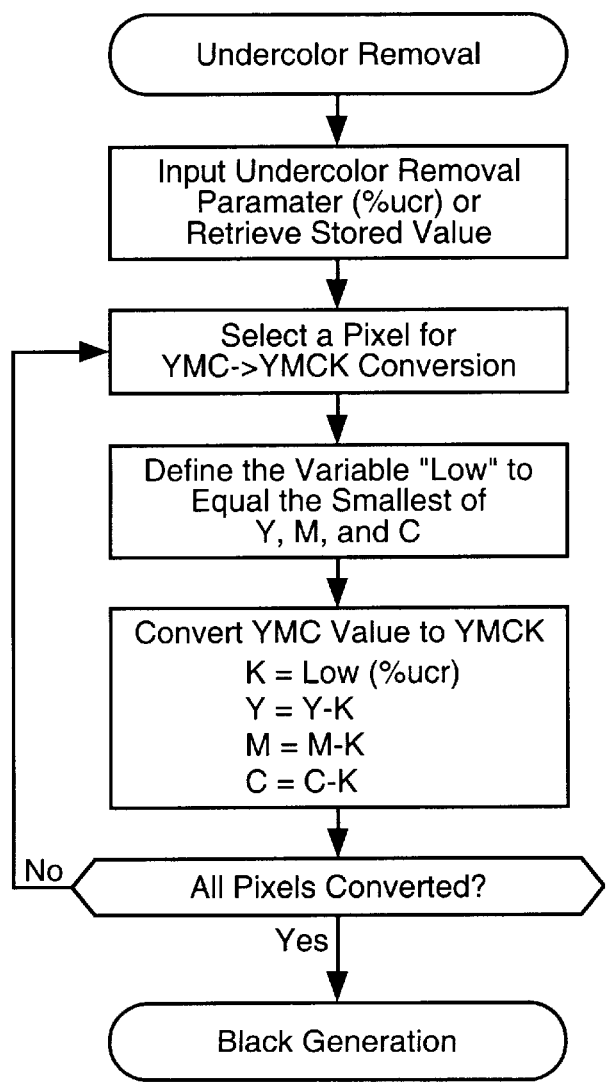
FIG. 5 is a flow chart of the undercolor removal routine of the color separation module.

The undercolor removal process is shown in the flow chart of FIG. 5. The undercolor removal process is used to convert a YMC value to an equivalent YMCK value by removing a gray component from a given pixel and replacing this gray component by a black (K) component. If the YMC value contains a non-zero gray component, the undercolor removal process converts a portion of this non-zero gray component to a K or black component. The amount of the gray component in the YMC component that is removed is controlled by a percent undercolor removal parameter (%ucr). The value of the %ucr parameter is selected by the user based on how a user chooses to alter the color image to be printed. Typically a high %ucr will be chosen for highly absorbent print paper like newsprint, and a lower %ucr for high quality, glossy prints. If %ucr is zero, then no K component is generated. If it is 100%, all the gray component is changed to K and subtracted from Y, M, and C. The undercolor removal function is defined as follows:

low = smallest of Y, M, and C $$K = \text{low} * (\%\text{ucr} \div 100)$$

$$Y = Y - K$$

$$M = M - K$$

$$C = C - K$$

Black Generation

Figure 6:
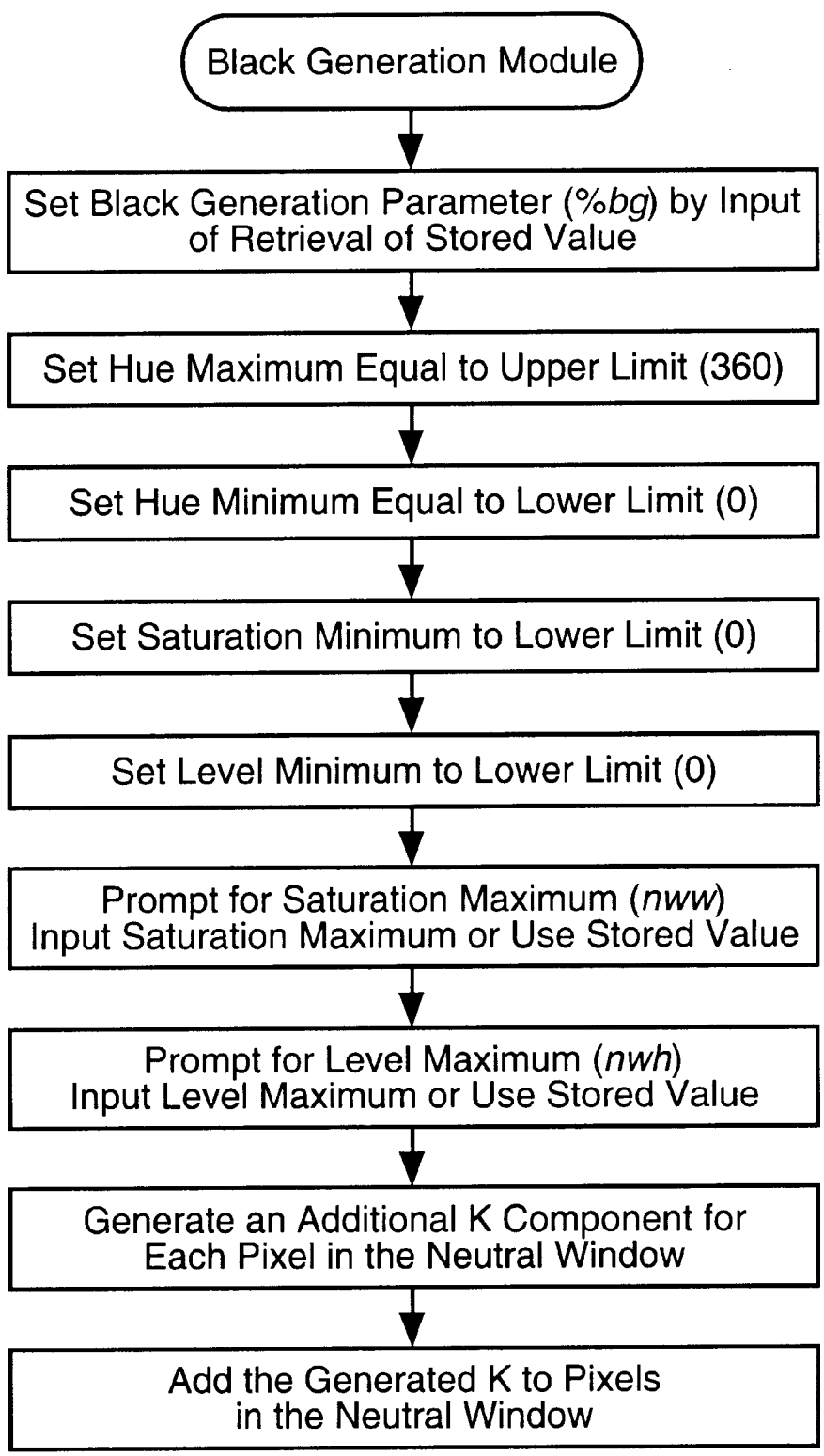
FIG. 6 is a flow chart of the black generation routine of the color separation module.

The black generation routine of the color separation module 24 is shown in the flow chart of FIG. 6. The function of the black generation routine is to add black to selected pixels of the color image. The addition of black to a color image is often desired to improve the appearance. The first step of black generation is to define parameters in HSL space to establish which pixels will receive additional black. Certain parameters are automatically set by the black generation program, while other parameters are prompted for and selected by the user. The black generation program is designed to allow a user to more easily select which pixels will receive additional black.

The black generation routine includes a method for defining pixels with HSL values for which additional black will be added. As indicated in the flow chart of FIG. 6, the black generation routine automatically sets the hue maximum equal to the upper limit of the hue range and the hue minimum equal to the lower limit of the hue range, indicating the immateriality of the hue to the black generation process. The saturation minimum is automatically set to be equal to the lower limit of the saturation range, and the level minimum is set equal to the lower limit of the level range. In particular, it is typically not desirable to add black to certain pixels, namely those which are fully or nearly fully saturated and those for light colors.

The dark, neutral pixels are those to which black can be added to advantage. In HSL space these are located close to the polar axis and lower, in the darker hemisphere, rather than higher, in the lighter hemisphere. As noted above, the hue does not affect whether black should be added, but the saturation and level do. In a preferred embodiment, the pixels to have black added are located in a cylinder in HSL space, coaxial with the pole and extending from the darkest end of the level pole. Other coaxial shapes may also be useful, such as cones, small spheres or the like. Preferably, the height is less than the full sphere height, since lighter pixels are not improved by the addition of black.

The three parameters that a user selects to control the black generation function are the percent black generation (%bg, a "potentiometer" to control how much black is generated for a given candidate pixel), the saturation maximum (known as the neutral window "nww") and level maximum (known as the neutral window height "nwh"), corresponding to the radius and the height, respectively, of the cylinder. The user selects the saturation maximum and level maximum based on his/her preference of what pixels should receive additional black. These are input to complete the definition of the set of pixels known as the neutral window to be given additional black. These parameters work together to control how much black is generation in addition to whatever was generated by undercolor removal.

An additional black component is then formed for each pixel within the neutral window. HSL values are also used to determine how much black is to added to the selected pixels. The different pixels do not all get the same amount of black.

The actual amount of black generated for a given pixel is a complicated function of %bg, nww and the level and saturation components of the HSL value for that pixel. If L and S are the level and saturation components for the given pixel, respectively, then the black generation function is defined as follows:

if the pixel is inside the neutral window then
   if nww is zero then
     add_K=(%bg/100)*(255−L) (make sure we don't divide by 0)
   else
     add_K=(%bg/100)*(255−L)*(1−(S/255)*(100/nww))
   endif
   K=K+add_K
   if K>255 the
     K=255 (make sure K does not exceed 255)
   endif
endif This calculation proceeds iteratively for each pixel in the image. Of course, the conversion of pixel data from YMC space to HSL space is also included, analogous to RGB→HSL transformation described above.

Using the above calculation, the amount of black added to a particular pixel is adjusted depending on the degree of darkness or saturation of a pixel. The darker the color of the pixel (i.e. the lower the level), the more black will be added to the pixel. And, less-saturated colored pixels will also receive more black. The function used to generate additional black for the selected pixels is designed to make the amount of black added vary smoothly with changes in level and saturation. In fact, the amount of black generated decreases laterally with increasing level and also decreases laterally with increasing saturation. Thus, the most black is generated at the south pole (pure black) on the HSL sphere, and no black at all is generated at the north pole (pure white). Furthermore, the most black is generated for pure grays (points which lie on the axis of the HSL sphere), and no black is generated for pixels not having a gray component.

Operation

In operation, an operator uses color control program 20 as follows. An operator first uses scanner 12 to scan and digitize an original color image. The digitized image is then displayed on computer 14. The operator may choose color correction module 22 to alter the color of the digitized image. Or, the operator may attach predefined, stored values to one or more original color images for use by the color control program. Color correction and color separation may be then carried out on the scanned images by the color control program in an unattended mode.

If the operator selects color correction module 22 instead of the unattended operation, the operator is prompted to select either the manual or the automated method for defining an HSL slice range. If the operator chooses the manual method, the color correction program prompts the user for hue, saturation, and level ranges. The operator selects maximum and minimum values for hue, saturation, and level ranges. The parameters are inputted by the color correction program and used to define the ranges of the pixels.

The operator is then prompted on whether the operator chooses to define a second HSL slice range. If that is the choice, the user is again prompted to choose between the manual or automated method of defining an HSL slice range. If the automated method is chosen, another HSL slice range is defined as follows. While viewing the digitized image on computer 14, the operator positions the mouse pointer on the area of the displayed image to be color corrected. By clicking the mouse on this area, the hue, saturation, and level ranges for the HSL slice are automatically established.

Seven or more different HSL slice ranges can be defined by the user. When the selected number of HSL slice ranges have been defined, the HSL slices are formed. The computer then color corrects the pixels contained within the HSL slices by using range and gradation transfer curves for each of the three color components cyan, magenta, and yellow in conventional fashion.

After color correction of selected pixels has been completed, the user is prompted for selection of the undercolor removal routine. Selection of the undercolor removal routine results in the user being prompted for a percent ucr parameter. Input of a percent ucr parameter results in a selected portion of a gray component in the pixels being removed and replaced by a black component such that YMCK values are formed.

The black generation routine can also be chosen by the user. Selection of the black generation routine results in the user being prompted for a black generation parameter and for a saturation maximum and a level maximum for selecting pixels for which an additional black component will be added. Based on these user selected parameters, additional black is added to selected pixels of the color image.

After use of color control program 20, the operator sends the corrected and separated color values of the color image to printer 16. Printer 16 prints the color-corrected reproduction of an original color image.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A color control method for use in an image reproducing process where a color image is reduced to a plurality of pixels having different colors with each pixel having a color value, comprising the steps of:

(a) assigning to each pixel an HSL value corresponding to the color of the pixel, wherein each color value falls within an HSL color space and includes a hue component falling within a hue range, a saturation component falling within a saturation range, and a level component falling within a level range;

(b) defining an HSL slice range, the step of defining the HSL slice range including the steps of:
    (1) defining a minimum and a maximum hue value;
    (2) defining a minimum and a maximum saturation value;
    (3) defining a minimum and maximum level value;

(c) forming an HSL slice by selecting at least one pixel which falls within the HSL slice range, wherein said slice range is defined by outwardly scanning pixels in all directions beginning at a user-selected reference pixel to form a like-colored sector of pixels surrounded by a discontinuity border of differently colored pixels;

(d) using the HSL range to determine which of the pixels of the color image are to be color corrected; and (e) color correcting the HSL slice such that the colors of the pixels contained within the HSL slice are altered.

2. The method of claim 1 further including the step of identifying the colors of the pixels with cubic color values located in a cubic color space where each cubic color value includes a first color component, a second color component, and a third color component, and wherein the step of color correcting the HSL slice includes adjusting the cubic color values of the pixels contained within the HSL slice.

3. The method of claim 2 wherein the cubic color values are RGB values where each RGB value includes a red component, a green component, and a blue component.

4. The method of claim 1 wherein the step of defining an HSL slice range includes the step of providing for the manual input of HSL slice parameters.

5. The method of claim 4 wherein the step of defining an HSL slice range includes the step of prompting a user for HSL slice parameters.

6. The method of claim 1 wherein the step of defining an HSL slice range is automated and includes the step of forming the HSL slice parameters based on the HSL value of a mouse-selected pixel, wherein the HSL value of the mouse-selected pixel falls within the HSL slice parameters.

7. The method of claim 6 wherein the automated method of defining the HSL slice range further includes the steps of:
   (a) defining a color discontinuity limit for selecting when two pixels are of sufficiently different colors to indicate a color discontinuity in the color image;
   (b) evaluating pixels beginning at the selected pixel and extending outwardly in all directions from the mouse-selected pixel so as to establish a sector in the color image containing like-colored pixels, the step of scanning pixels comprising the steps of:
      (1) comparing color values of the selected pixels with the color values of other pixels in the color image to determine color discontinuity values between scanned pixels,
      (2) comparing the color discontinuity values with the color discontinuity limit to establish the like-colored sector; and
   (c) forming the HSL slice range based on the color values of the pixels within the like-colored sector.

8. The method of claim 1 further including the steps of:
   (a) providing for the selection of a plurality of different HSL slice ranges defining a plurality of HSL slices; and
   (b) forming a plurality of HSL slices, the step of forming a plurality of HSL slices including the steps of:
      (1) testing to determine whether the pixels of the color image overlap a plurality of different HSL slice ranges so as to fall within a plurality of HSL ranges,
      (2) placing a pixel falling within a plurality of HSL slice ranges in only one HSL slice range where the HSL slice range in which an overlapping pixel is placed is based on the order in which the HSL slice ranges were defined.

9. A color control method as claimed in claim 1 further comprising the preliminary step of storing the minimum and maximum hue, saturation and level values to be used and the defining step includes retrieving the stored values for use in the defining step.

10. A color control method as claimed in claim 1 further comprising the steps of:
   (a) identifying the colors of the pixels with cubic color values located in a cubic color space where each cubic color value includes a first color component, a second color component, and a third color component;
   (b) generating a black color component removed from the first, second and third color components in an amount equal to a proportion of the least of them;
   (c) reducing each of the first, second and third color components by an amount equal to the black color component; and
   (d) printing the pixels of the image with inks of the first, second, third and black color components.

11. The method of claim 10 wherein the first, second and third color components are yellow, cyan and magenta.

12. A color control method as claimed in claim 1 further comprising the steps of:
   (a) identifying the colors of the pixels with color values located in a color space where each cubic color value includes a first color component, a second color component, a third color component and a black color component;
   (b) evaluating the first second and third color components of each pixel in HSL space including hue, saturation and level values to determine if the pixel is located in a neutral window of HSL space and, if so, adding to the black color component, and
   (c) printing the pixels of the image with inks of the first, second, third and black color components.

13. A color control method as claimed in claim 12 wherein the HSL space is a polar coordinate system and the neutral window is a cylinder coaxial with pole of HSL space.

14. A color control method as claimed in claim 12 further comprising the preliminary step of storing parameters defining the neutral window and wherein the evaluating step includes retrieving the stored values for use in the evaluating step.

15. A color control method as claimed in claim 12 wherein the HSL space is a polar coordinate system including darker and lighter hemispheres, the neutral window is located coaxial with the pole of HSL space and the majority of the neutral window is in the darker hemisphere.

16. The method of claim 1 wherein step (c) further comprises the steps of:
   (1) scanning in a first direction a target pixel located adjacent to the reference pixel;
   (2) if the target is similar to the reference pixel, then it is included in a sector of like-colored pixels and its HSL values are used for comparing with a subsequently scanned pixel, wherein the target pixel is treated as a reference pixel and the most recently scanned pixel adjacent and to the left of the target pixel is considered as a target pixel; and
   (3) iterating steps (1) and (2) until either the edge of the image or a discontinuity in the image is encountered.

17. The method of claim 16 further comprises the steps of:
   (4) scanning in a second direction, that is opposite to said first direction, a target pixel located adjacent to the reference pixel upon encountering the edge of the image or a discontinuity in the image;
   (5) if the target pixel is similar to the reference pixel, then it is included in a sector of like-colored pixels and its HSL values are used for comparing with a subsequently scanned pixel, wherein the target pixel is treated as a reference pixel and the most recently scanned pixel is considered as a target pixel; and
   (6) iterating steps (4) and (5) until either the edge of the image or a discontinuity in the image is encountered.

18. The color control method of claim 1 further comprises the steps of:
   (a) identifying the colors of the pixels with color values located in a color space where each cubic color value includes a first color component, a second color component, a third color component and a black color component;

(b) evaluating the first, second, and third color components of each pixel in HSL space including hue, saturation and level values to determine if the pixel is located in a neutral window of HSL space and, if so, adding to the black color component following the iterative steps of:
if nww is zero, then
add K=(%bg/100)*(255−L) (make sure we don't divide by zero)
else
   add K=(%bg/100)*(255−L)*(1−(S/255)*(100/nww))
endif
K=K+add K
If K>255 then
   K=255
endif
endif;
where nww=neutral window width; %bg=percent black generation; L=luminance; S=saturation, and (c) printing the pixels of the image with inks of the first, second, third and black color components.

19. A color correction apparatus for correcting stored, scanned pixel color data comprising,
a data input device,
a memory for storing pixel color data,
a video display for displaying stored pixel color data to depict a color image, and
a processing unit for converting stored pixel color data from a cubic color value to an HSL color value and for receiving data input for a color correction of selected pixels falling within a defined HSL slice, said HSL slice is formed by selecting at least one pixel which falls within the HSL slice and wherein said slice is defined by outwardly scanning pixels in all directions beginning at a user-selected reference pixel to form a like-colored sector of pixels surrounded by a discontinuity border of differently colored pixels.

20. A color correction apparatus as claimed in claim 19 further comprising a scanner to raster scan a view and generate signals representative of cubic color values of pixels of the scanned view.

21. A color correction apparatus as claimed in claim 19 further comprising a memory for storing the minimum and maximum hue, saturation and level values to be used and the processing unit is adapted to retrieve the stored values for use in color correction.

22. A color correction apparatus as claimed in claim 19 further comprising an undercolor removal apparatus for removing gray components from stored, scanned pixel color data and printing the resultant image comprising,
said memory for storing pixel color data including storing cubic color values located in a cubic color space where each cubic color value includes a first color component, a second color component, and a third color component,
said processing unit including for generating a black color component removed from the first, second and third color components in an amount equal to a proportion of the least of them and for reducing each of the first, second and third color components by an amount equal to the black color component; and
a printer to print the pixels of the image with inks of the first, second, third and black color components.

23. A color correction apparatus as claimed in claim 19 further comprising a black addition apparatus for adding black components to stored, scanned pixel color data and printing the resultant image comprising,
said memory for storing pixel color data including storing color values located in a color space where each color value includes a first color component, a second color component, and a third color component, and a black color component,
said processing unit including for evaluating the first second and third color components of each pixel in HSL space includign hue, saturation and level values to determine if the pixel is located in a neutral window of HSL space and, if so, adding to the black color component, and
a printer to print the pixels of the image with inks of the first, second, third and black color components.

24. A color correction apparatus as claimed in claim 23 further comprising a memory for storing parameters defining the neutral window and the processing unit is adapted to retrieve the stored parameters for use in color correction.

25. A color correction apparatus as claimed in claim 19 wherein the processing unit is also capable of converting pixels to YMC space and performing an undercolor removal data operation.

26. A color correction apparatus as claimed in claim 19 wherein the processing unit is also capable of converting pixels to YMC space and performing a black generation data operation.

27. A color correction apparatus as claimed in claim 19 further comprising a four color printer capable of printing black, yellow, cyan and magenta.

28. A color control method for use in an image reproducing process where a color image is reduced to a plurality of pixels having different colors with each pixel having a color value, comprising the steps of:
(a) assigning to each pixel an HSL value corresponding to the color of the pixel, wherein each color value falls within an HSL color space and includes a hue component falling within a hue range, a saturation component falling within a saturation range, and a level component falling within a level range;
(b) defining an HSL slice range, the step of defining the HSL slice range comprises the steps of:
(1) defining a minimum and a maximum hue value;
(2) defining a minimum and a maximum saturation value;
(3) defining a minimum and maximum level value;
(4) defining a color discontinuity limit for selecting when two pixels are of sufficiently different colors to indicate a color discontinuity in the color image;
(5) evaluating pixels beginning at the selected pixel of step (4) and extending outwardly in all directions from the selected pixel so as to establish a sector in the color image containing like-colored pixels, the step of scanning pixels further comprising the steps of:
(i) comparing color values of the selected pixels with the color values of other pixels in the color image to determine color discontinuity values between scanned pixels,
(ii) comparing the color discontinuity values with the color discontinuity limit to establish the like-colored sector; and
(6) forming the HSL slice range based on the color values of the pixels within the like-colored sector;
(c) forming an HSL slice by selecting at least one pixel which falls within the HSL slice range;

(d) using the HSL range to determine which of the pixels of the color image are to be color corrected; and (e) color correcting the HSL slice such that the colors of the pixels contained within the HSL slice are altered.

29. A color method for use in an image reproducing process where a color image is reduced to a plurality of pixels having different colors with each pixel having a color value, comprising the steps of:

(a) assigning to each pixel an HSL value corresponding to the color of the pixel, wherein each color value falls within an HSL color space and includes a hue component falling within a hue range, a saturation component falling within a saturation range, and a level component falling within a level range;

(b) defining an HSL slice range, the step of defining the HSL slice range is automated and includes steps of:
 (1) defining a minimum and a maximum hue value;
 (2) defining a minimum and a maximum saturation value;
 (3) defining a minimum and maximum level value;

(c) providing for the selection of a plurality of different HSL slice ranges defining a plurality of HSL slices;

(d) forming at least one HSL slice by selecting at least one pixel which falls within the HSL slice range, the step of forming the HSL slice including the steps of:
 (1) testing to determine whether the pixels of the color image overlap a plurality of different HSL slice ranges so as to fall within a plurality of HSL ranges;
 (2) placing a pixel falling within a plurality of HSL slice ranges in only one HSL slice range where the HSL slice range in which an overlapping pixel is placed is based on the order in which the HSL slice ranges were defined;

(e) using the HSL range to determine which of the pixels of the color image are to be color corrected; and (e) color correcting the HSL slice such that the colors of the pixels contained within the HSL slice are altered.

30. A color correction apparatus for use in an image reproducing process where a color image is reduced to a plurality of pixels having different colors with each pixel having a color value, comprises:

a data input device;

a memory for storing pixel color data;

a video display for displaying stored pixel color data to depict a color image;

means for assigning to each pixel an HSL value corresponding to the color of the pixel, wherein each color value falls within an HSL color space and includes a hue component falling within a hue range, a saturation component falling within a saturation range, and a level component falling with a level range;

means for defining an HSL slice range, wherein defining said slice range comprises the steps of:
 (1) defining a minimum and a maximum hue value;
 (2) defining a minimum and a maximum saturation value;
 (3) defining a minimum and maximum level value;
 (4) defining a color discontinuity limit for selecting when two pixels are of sufficiently different colors to indicate a color discontinuity in the color image;
 (5) evaluating pixels beginning at the selected pixel of step (4) and extending outwardly in all directions from the selected pixel so as to establish a sector in the color image containing like-colored pixels, the step of scanning pixels further comprising the steps of:
  (i) comparing color values of the selected pixels with the color values of other pixels in the color image to determine color discontinuity values between scanned pixels,
  (ii) comparing the color discontinuity values with the color discontinuity limit to establish the like-colored sector; and
 (6) forming the HSL slice range based on the color values of the pixels within the like-colored sector;

means for forming an HSL slice by selecting at least one pixel which falls within the HSL slice range; and means for color correcting images by using the HSL range to determine which of the pixels of the color image need color correction.

31. An apparatus for color correcting an image reduced to a plurality of pixels having different colors with each pixel having a color value, comprises:

means for assigning to each pixel an HSL value corresponding to the color of the pixel, wherein each color value falls within an HSL color space and includes a hue component falling with a hue range, a saturation falling within a saturation range, and a level component falling with a level range;

means for defining an HSL slice range which includes defining a minimum and a maximum hue value, defining a minimum and a maximum saturation value, and defining a minimum and maximum level value;

means for selecting a plurality of different HSL slice ranges defining a plurality of HSL slices;

means for forming at least one HSL slice, said slice being formed by selecting at least one pixel falling within the HSL slice range;

means for testing to determine whether the pixels of the color image overlap a plurality of different HSL slice ranges so as to fall within a plurality of HSL ranges; and means for color correcting the pixels contained within the HSL slice.

* * * * *